Sept. 10, 1946.    W. SHOCKLEY ET AL    2,407,294
WAVE PROPAGATION DEVICE
Filed April 17, 1942    2 Sheets-Sheet 1
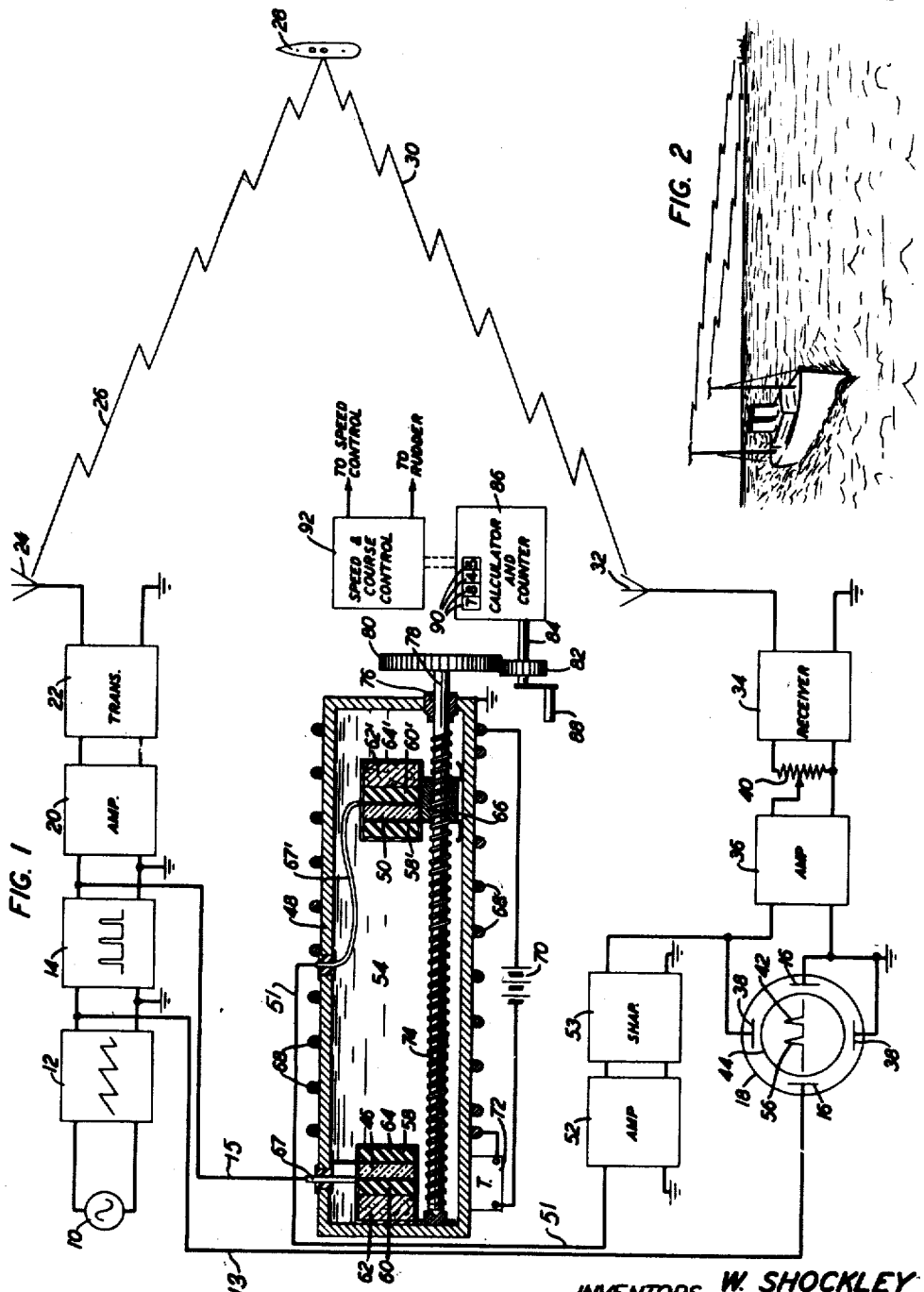
INVENTORS  W. SHOCKLEY
           G. W. WILLARD
BY
           Harry C. Hart
           ATTORNEY

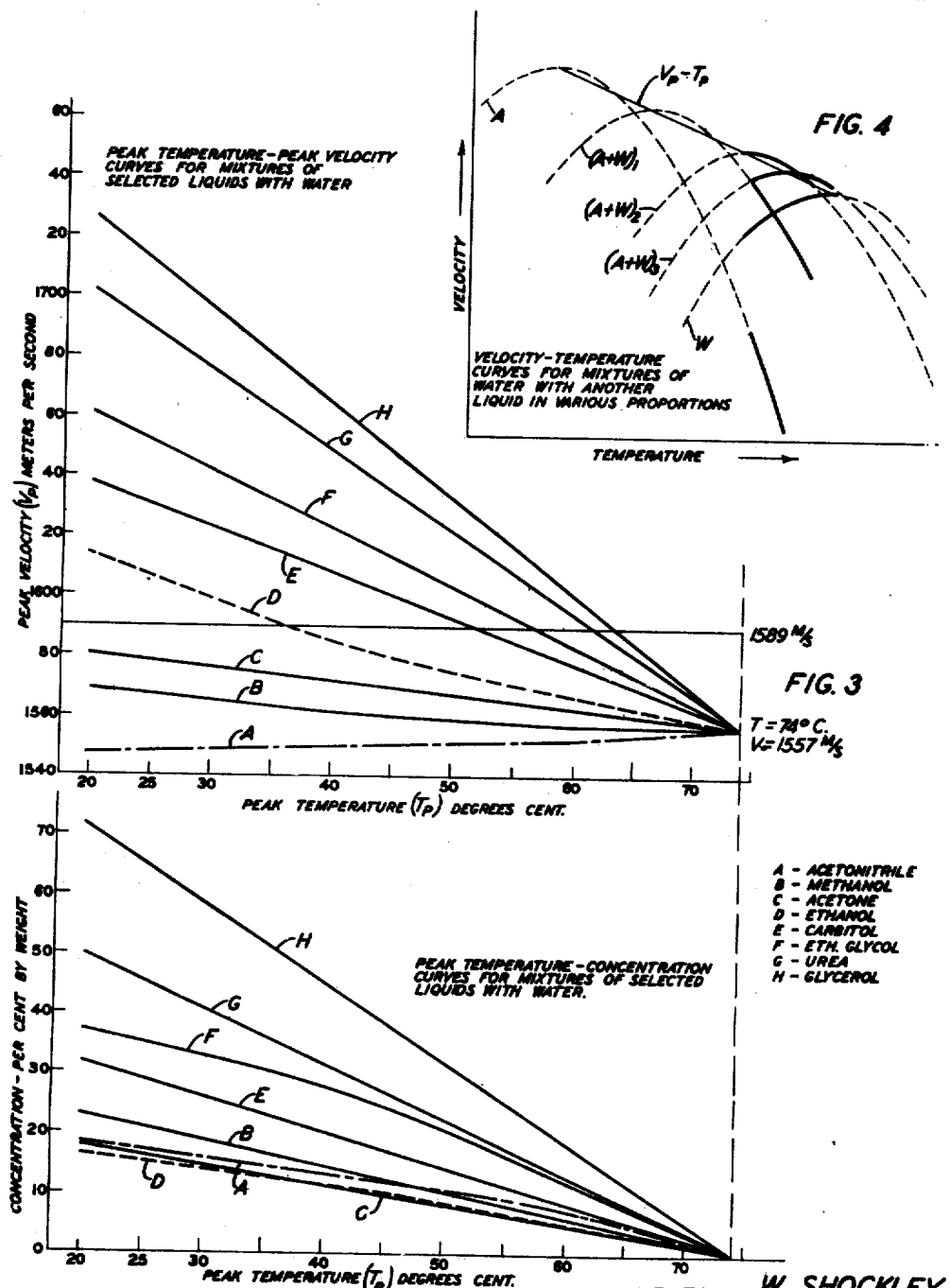

Patented Sept. 10, 1946

2,407,294

UNITED STATES PATENT OFFICE 2,407,294

WAVE PROPAGATION DEVICE

William Shockley, Madison, and Gerald W. Willard, Fanwood, N. J., assignors to Bell Telephone Laboratories, Incorporated, New York, N. Y., a corporation of New York Application April 17, 1942, Serial No. 439,396

11 Claims. (Cl. 178—44)

This invention relates to wave propagation devices and particularly to sonic devices in which an elastic wave is propagated from one point to another thereof, for example, a compression wave of ultra-sonic frequency.

A principal object of the invention is to provide a wave propagation device having a zero temperature coefficient of propagation velocity.

A related object is to provide a variable delay device having a zero temperature coefficient.

Another object is to provide a precision variable time delay device, for example a device suitable for use as the measuring element in a system for the location of objects by the echo method, in which the time delay is rationally related to a convenient unit of distance measure so that the delay-altering means may be directly calibrated in such units.

A closely related object is to provide means whereby the delay-altering means of such a time delay device may be mechanically coupled with a calculating instrument of standard construction.

These and other objects are accomplished, in accordance with the invention, by the provision of a wave supporting fluid, energy input and output means such as piezoelectric crystals spaced apart in said fluid, and means for varying the geometrical separation of said crystals, the fluid itself being a liquid mixture of two or more components, one having a negative coefficient of propagation velocity and another a positive coefficient, the proportions of the components being so chosen as to give for the mixture as a whole a zero temperature coefficient at a preassigned velocity and at a convenient and easily controllable temperature. As a specific preferred example, there may be employed a mixture of ethylene glycol with water in the proportions of 16 volumes of ethylene glycol to 100 volumes of water, (15.1 per cent ethylene glycol to 84.9 per cent water, by weight) which mixture has a propagation velocity of 1739 yards per second at a temperature of 135° F. for elastic compression waves, and a zero temperature coefficient at that temperature.

While useful as a light valve, a television scanning device or an element of an electromechanical filter, the invention is particularly suitable as an element of a radio locator system in which the time required for a pulse of electromagnetic energy to travel from a transmitter to a distant object and return is compared with the time required for the travel of a compression wave or pulse from the energy input means of the variable delay device to the output means. The latter means may be mounted for movement relatively to the former means, the movement being effected and controlled by a lead screw. With certain ones of a series of discrete values of the propagation velocity, each full turn of a simple lead screw bears a simple rational relation to a certain definite change in the location of the objects; i. e., it stands in the ratio of small whole numbers thereto. For example, a lead screw having $15^{11}/_{15}$ turns to the inch may be constructed with standard tools; and with the preferred value of 1739 yards per second for the propagation velocity, six turns of this lead screw correspond exactly to 1000 yards and each fraction of a turn to a like fraction of this distance. Thus a countershaft, geared to the lead screw head through a simple gear train of ten-to-six turn ratio, may be directly calibrated in yards, each turn corresponding to 100 yards and each tenth of a turn to 10 yards. Furthermore, the lead screw may be mechanically coupled through those same gears or others to a calculating device of standard construction, whose output may perform any desired operation.

For example, the system as a whole may be mounted in a ship, an airplane or other vehicle for providing the pilot with exact information as to his distance from an unseen object or obstruction, and the calculator output may be caused to actuate steering or other mechanism in such a way as to cause the vehicle to travel toward the object or to avoid the obstruction by any known margin. Again, in fire control apparatus, the calculator output may adjust the deviation between line of sight and line of fire and also make desired adjustments in a fuse-setting mechanism. In this way far greater rapidity of fire becomes possible than has been possible in the past under conditions in which it is necessary for a conscious agent to translate the elapsed time as indicated by a delay device into distance units suitable for feeding into the computing mechanism.

In view of its special suitability as an element in such a radio locator system, the invention will be described in detail as embodied in such a system. The following description of such a preferred embodiment is to be taken in connection with the appended drawings in which:

Fig. 1 is a schematic diagram of a radio locator system employing the invention;

Fig. 2 is a pictorial representation of a system in which the invention may be employed;

Fig. 3 is a group of curves showing the interrelation of concentration, peak temperature and peak velocity, as hereinafter defined, for liquid mixtures of various proportions; and Fig. 4 is a group of curves illustrating a discovery on which the invention is in part based.

Referring now to the figures, any suitable means may be provided for generating electromagnetic energy, for example, in the form of a sequence of sharp pulses, transmitting these pulses in the direction of an object to be located, receiving the reflected pulses, amplifying the received pulses and comparing the instant of reception with the instant of transmission as delayed by the apparatus of the invention. Thus, purely by way of example, a generator 10 of high frequency energy, of the order, for example, of 1000 cycles per second, feeds a saw-tooth shaping circuit 12, which in turn feeds a pulse-shaping circuit 14. The output terminals of the saw-tooth shaping circuit 12 may be connected via conductor 13 and ground to the horizontal deflecting elements 16 of a cathode ray oscilloscope 18 to provide a time base therefor. The output terminals and energy of the pulsing circuit 14 may be fed through suitable amplifier 20 and transmitter apparatus 22 to an antenna 24 whence pulses 26 of electromagnetic energy are radiated through space toward an object, for example, a ship 28, reflected thereby and returned to a receiving antenna 32. The current induced in the receiving antenna may be converted in any suitable manner as by a receiver 34, the output of which, after amplification by an amplifier 36, may be applied to the vertical deflecting elements 38 of the oscilloscope 18. Since, in general, the output of the receiver 34 depends on the distance of the reflecting object, means are preferably provided for compensating for this variation, as for example a potentiometer 40 in the output circuit of the receiver 34. In addition, automatic gain adjusting means, of any suitable type, are preferably included in the receiver itself.

With the system as thus far described, an indication 42 appears on the screen 44 of the oscilloscope 18, the position of which, for example its displacement along a horizontal scale, depends on the time elapsing between the instant of radiation and the instant of reception of a pulse.

A portion of the energy of the pulses is tapped at the output terminals of the pulsing circuit 14 and applied via ground and conductor 15 through insulated tube 67, to a suitable piezoelectric crystal 46 mounted within and close to one end of a suitable liquid-tight container 48. One face of crystal 46 may be grounded to container 48, which is also grounded as shown. A second piezoelectric crystal 50, which may be similar to the first crystal, is movably mounted within the container 48 and its output energy is supplied via ground 48 and conductor 51, insulated from liquid 54 by a tube 67', through an amplifier 52 and a shaper 53 to the vertical deflecting elements 38 of the oscilloscope. The shaper 53, which may be of any suitable type, serves merely to improve the wave form of the crystal output for visual examination on the oscilloscope screen. It is advantageous but by no means essential.

It is obvious that the roles of the fixed crystal and the movable crystal may be interchanged, energy being delivered to the movable crystal from the shaper 14 and withdrawn from the fixed crystal. Indeed, such an arrangement may offer certain advantages in that any minor distortions that may arise from crystal movement are restricted to the driving circuit and excluded from the receiving and indicating circuit. The arrangement of Fig. 1, in which the fixed crystal is driven, is selected for purposes of illustration for the reason that it is somewhat simpler.

When a suitable liquid 54 is placed in this container 48, substantially filling the region between the driving crystal 46 and the output crystal 50, then expansions and contractions of the driving crystal 46 in response to the pulsing signals applied thereto give rise to compressions and dilations of the liquid 54 in contact therewith. These compressions and dilations produce compressional waves which travel through the liquid column from the driving crystal 46 to the receiving crystal 50 where they exert forces upon the latter which may be translated into electrical impulses in accordance with known principles. As these electrical impulses are applied to the vertical deflecting elements 38 of the cathode ray oscilloscope, there will appear on the oscilloscope screen 44 a second indication 56 whose position along the horizontal scale is a measure of the time elapsing between the instant at which a particular compression wave pulse commences its travel through the liquid and the instant at which it reaches the receiving crystal.

Principles are well known through which the compression wave fronts in the liquid medium are caused to remain as nearly parallel as possible in the course of their travel. Means and methods have also been proposed for matching the crystal impedances to the impedance of the medium, and also for reducing as far as possible the effect of reflections and radiations from the rear face of the driving crystal.

In order that the driving crystal 46 shall respond freely and rapidly to the incidence of an electric signal of desired wave form, for example, a sharp pulse, it is preferred that the ratio of its reactance to its resistance (each as modified by its environment) shall be low. In electrical terminology, the impedance of the crystal should be matched with that of the liquid column. For a full description of means and methods by which this impedance match may be effected, reference may be made to application of W. L. Bond and W. P. Mason, Serial No. 407,456, filed August 19, 1941. In brief, it is the teaching of that application that the crystal 46, its faces already provided with suitable electrodes in well-known manner, may be embedded between blocks of plastic material whose constitutions and dimensions are selected with the impedance match in mind. For example, if a Rochelle salt crystal be employed, the front block 58 may be of Lucite, its thickness being preferably one-quarter wavelength at the frequency of the principal component of the waves to be transmitted through the liquid. This serves to match the impedance of the crystal with that of the liquid column, if the latter be water or a liquid mixture whose impedance does not greatly differ from that of water. The rear block 60 may be similar or of different constitution as the case may require, it being borne in mind that its function is to match the rear face impedance of the crystal to an absorber, for example, a mass of felt 62.

In cases where it is desirable to exclude the liquid 54 from direct contact with the crystal 46 and associated impedance-corrective and energy absorbing members, for example, when a Rochelle salt crystal soluble in water is employed, a thin membrane 64 of rubber or the like may form a liquid-tight envelope around the crystal assembly without appreciably damping its action. The effect of such membrane in modifying impedances, if appreciable, may be taken into account in the over-all design of the assembly.

The same considerations apply to the receiving crystal assembly, to the end that a compression wave pulse incident thereon from the liquid column may produce an electrical pulse in the output circuit without distortion. The crystal 50 may, therefore, be embedded between blocks 58', 60' of plastic material, backed by a mass of felt 62', and surrounded by a rubber membrane 64'.

The driving crystal assembly may be mounted in any convenient manner as by bolts, not shown, at one end of the container 48 and the receiving crystal assembly may be similarly mounted on a bracket 66 arranged for travel lengthwise of the container.

One face of each crystal may be electrically grounded to the container wall, while signals may be fed to the other face of the driving crystal and withdrawn from the other face of the receiving crystal by way of suitable conductors, for example, flexible coaxial lines. Inasmuch as the liquid column may not be an insulator, a single wire surrounded by a rubber tube 67, 67' will act as a coaxial line, the liquid in contact with the tube, together with the metal parts of the container 48, serving as the outer conductor.

In order to prevent excessive temperature variations from reducing the precision of the apparatus, it is preferred to maintain the container 48 at a substantially constant temperature. To this end a heating coil 68 may be wound about the container 48, supplied from a suitable source 70 and through a relay controlled by a suitable thermostatic device 72. The container and its heating equipment may then be embedded in some heat-insulating and cushioning material such as felt, not shown.

When the pulses derived from the pulsing circuit 14 are transmitted over both paths, i. e., the path of radiant energy to the object and back and the path through the wave supporting fluid column 54, two indications 42, 56 in general appear on the oscilloscope screen 18, the distance of each one along the horizontal scale being a measure of the total elapsed time between the instant at which the pulse originates and the instant at which it reaches the oscilloscope.

The receiving piezoelectric crystal 50 is mounted within the container 48 for movement toward or away from the driving crystal 46. For example, it may be mounted on a bracket 66 which is arranged to slide on the floor of the container, being guided and maintained in proper orientation, i. e., squarely facing the driving crystal 46, in any suitable manner. To cause movement and adjust the position of the receiving crystal 50, a lead screw 74 may extend the full length of the container 48, engaging with a threaded portion of the crystal mounting bracket 66 and passing through a stuffing box 76 at the end of the container 48. The projecting portion 78 of the lead screw 74 may be provided with a gear 80 or other suitable mechanism for coupling through an other gear 82 to the shaft 84 of a counting and calculating device 86, and also to a manually operable crank 88. Rotation of this crank 88 causes rotation of the lead screw 74 and therefore axial movement of the receiving crystal 50 toward the driving crystal 46. At the same time suitable means may be provided within the calculating and counting apparatus 86 such as decade dials 90, for giving an indication of the number of turns of the shaft 84, and therefore of the lead screw 74, measured from a datum corresponding to zero displacement between the driving crystal 46 and the receiving crystal 50.

An attendant may then rotate the crank 88 in one direction or the other to increase or reduce the spacing between the crystals 46, 50. This increases or reduces the time of travel for pulses over the second path and therefore moves the second screen indication 56 toward or away from the first one 42. It will be understood that when by rotation of the crank 88 the two indications 42, 56 are brought into coincidence on the oscilloscope screen 44, the times of travel of the pulse over both paths are alike. When the medium 54 within the delay cell is selected in accordance with the principles of the invention in correspondence with the pitch of the lead screw 74, for example, when the liquid is such as to have a propagation velocity of 1739 yards per second and the lead screw pitch is $15^{11}/_{15}$ threads per inch, and the gear ratio between the lead screw 74 and the countershaft 84 is ten-to-six, then each turn of the countershaft 84 corresponds exactly to an object distance of 100 yards, and a tenth of a turn corresponds to an object distance of 10 years, so that the dials 90 on which the turns are counted indicate the object distance in yards directly. Under these conditions the calculating apparatus 86, whose internal construction may be of any suitable type, well known per se, may be directly coupled or geared to appropriate utilization means. Apparatus of this character is known which translates information fed to its input crank 88 in the form of a specific number of turns and fractions of turns into output movements of a sort suitable for application to control apparatus 92 for causing variations in the speed or course of an airplane or ship in accordance with a prearranged plan; or for causing correct amounts of deviation between the line of sight and the line of fire of a gun and for adjusting a fuse-setting mechanism.

In the past it has been necessary for a conscious agent to translate the indications of the delay device into movements suitable for supplying to the calculator 86. With an elastic fluid medium embodying the principles of the invention, however, the assistance of this conscious agent is dispensed with, since the separation between the crystals 46, 50, and therefore the elapsed time within the elastic fluid medium 54, may be made to correspond exactly with the proper amount of rotation of the input crank 88 of the calculator 86.

As a result of extensive laboratory tests it has been found that, with the sole exception of water, none of the multitude of single liquid substances tested exhibits a zero temperature coefficient of propagation velocity at any temperature within the range likely to be encountered in practice, i. e., temperatures of the order of 0° to 100° C. The sole exception, water, has a zero temperature coefficient at the temperature of 74° C. The use of water alone at this high temperature is objectionable for many reasons. Its vapor pressure is high so that evaporation becomes a problem. A considerable load is placed on the associated heating equipment 68, 70. The velocity-temperature curve for water drops fairly rapidly on either side of this temperature so that a high degree of precision is required of the associated thermostatic apparatus 12 in order to hold the temperature constant. The propagation velocity for compressional waves in water at this temperature is 1557 meters per second, and it is difficult, if not impossible, to construct a suitable lead screw with commercially available screw-cutting equipment which shall operate with this particular velocity in order to permit the use of direct reading dials 90.

Throughout the temperature range likely to be encountered in the field, it has been found that each of a large number of liquid substances is characterized by a negative temperature coefficient, while the temperature coefficient of water in the same range is positive. This opens up the possibility that a properly selected mixture of water with some other liquid may have a zero temperature coefficient at some temperature within this range and for an exactly specified propagation velocity.

Tests have shown this surmise to be correct and that these possibilities may be realized with a number of different liquid mixtures. Some of the more important test results are graphically exhibited in Fig. 3 in which the upper curves show the relation between peak velocity and peak temperature (velocity and temperature, respectively, for which the temperature coefficient is zero) for a number of different liquid mixtures of water with some other substance while the lower curves show the concentrations at which the peak temperatures occur. From this figure it appears that a zero temperature coefficient of propagation velocity may be obtained at various temperatures within a fairly wide range, for example at a temperature of 25° C., with any of the mixtures given in Table I, the corresponding peak velocities being likewise given in the table. Such a condition might well be desirable for electromechanical filter applications, for example, in which the precise value of the peak velocity is unimportant and in which temperatures far in excess of room temperatures are not likely to be encountered.

Table I (Liquid mixtures having zero temperature coefficients at 25° C.)

| Substances | Proportions by weight | Peak velocity | Peak temperature |
|---|---|---|---|
| | Per cent | Meters per second | ° C. |
| Acetonitrile and water | 17–83 | 1,548 | 25 |
| Methanol and water | 21.5–78.5 | 1,568 | 25 |
| Acetone and water | 16–84 | 1,579 | 25 |
| Ethanol and water | 15–85 | 1,605 | 25 |
| Carbitol and water | 29–71 | 1,631 | 25 |
| Ethylene glycol and water | 35–65 | 1,652 | 25 |
| Urea and water | 46–54 | 1,688 | 25 |
| Glycerol and water | 65–35 | 1,710 | 25 |

All of the substances have been measured in the range 50° C. to 75° C., while for some of them, e. g., acetonitrile, ethanol and acetone, the measurements have been extended down to the 25° C. range. From all indications the curves of Fig. 3 for the remaining mixtures are correct as to general trend and orders of magnitude.

Again, it appears from Fig. 3 that a peak velocity of 1589 meters per second (1739 yards per second) may be obtained with the liquids and in the concentrations given (along with others not shown in the figure) in Table II, in which are also given the peak temperatures at which this peak velocity occurs.

Table II

Liquid mixtures having zero temperature coefficients at a peak velocity of 1589 meters per second (1739 yards per second).

| Substances | Proportions by weight | Peak velocity | Peak temperature |
|---|---|---|---|
| | Per cent | Meters per second | |
| Ethylene glycol and water | 15.1–84.9 | 1,589 | 57.4° C.=135° F. |
| 2,3 butylene glycol and water | 9.5–90.5 | 1,589 | 56.7° C.=134° F. |
| Tetraethylene glycol and water | 13–87 | 1,589 | 54° C.=129.2° F. |
| Diethylene glycol and water | 15–85 | 1,589 | 55° C.=131° F. |
| Triethylene glycol and water | 12.5–87.5 | 1,589 | 55° C.=131° F. |
| Carbitol and water | 12.5–87.5 | 1,589 | 52.5° C.=126.5° F. |
| Glycerol and water | 12–88 | 1,589 | 65° C.=149° F. |
| Ethanol and water | 13–87 | 1,589 | 37° C.=98.6° F. |
| Urea and water | 11.5–88.5 | 1,589 | 62.5° C.=144.5° F. |

It is possible to set up a measure of the suitability of any particular liquid combination for any particular application. In principle this measure of suitability may be stated in the form of a quantitative definition or figure of merit, provided that quantitive values based on some common scale, can be given to various individual features of the mixtures. Proceeding on the assumption that this can be done, consider the liquid mixtures of the above tables in the light of the following desirable features.

The components are completely miscible in the required proportions.

The departure $\Delta V$ of the velocity from its peak value $V_p$, for a given departure $\Delta T$ from the peak temperature $T_p$, is small. The V—T curves for the liquids tested are in general parabolic so that $$\Delta V = \beta (\Delta T)^2$$

where the constant $\beta$ is a measure of the temperature stability.

The absorption factor (A) for compression waves is small;

The range between freezing point $(T_f)$ and boiling point $(T_b)$ is wide;

The peak temperature falls well within this range; i. e., both $(T_b-T_p)$ and $(T_p-T_f)$ are fairly large;

The vapor pressure $(P_v)$ is not excessive;

The chemical stability (S) of the mixture is high;

When allowed to freeze, these liquid mixtures develop a mushy ice which is not solid like the ice formed when pure water freezes. Therefore, the destructiveness (D) of ice formation is low;

The corrosiveness (C) is low;

The commercial availability (B) of the components is high.

In addition, in the case of each of the mixtures of Table II, the peak velocity $V_p$ has a value such that comparative simplicity (G) of the lead screw 74 and gear train 80, 82 suffice to permit the countershaft 84 to be directly calibrated in yards. Furthermore, with the exception of ethanol, the peak temperature $T_p$ is somewhat above the highest ambient temperature which is likely to be encountered, but not so high as to place an undue load on the temperature control equipment.

With the above features in mind, a figure of merit may be set up for the liquid mixtures of the invention. This figure of merit is not to be taken as having any very exact quantitative significance, but it serves to bring out the manner in which the various features which are common to the various mixtures and advantages in the various uses are interrelated. This figure of merit is $$F.M. = \frac{SB}{ACDP_a} \frac{(T_b-T_f)(T_b-T_p)(T_p-T_f)}{\beta}$$

It is a measure of the best practical compromise between the various factors which influence the choice of the liquid mixture. An extensive series of measurements has shown that this figure of merit is uniformly low for unsuitable mixtures and uniformly high for liquids which are suitable. To achieve the maximum, there is required a proper coordination of all of the quantities defined above. Coordination of some of these factors will result in a partial maximum with respect to variations of these quantities, but to obtain the absolute maximum it is necessary that all of these quantities be related substantially in the manner called for by this figure of merit, at least in so far as their trends are concerned.

For use as a light valve or a television scanning device, it is of course important that the mixture be clear and have a high transmission factor for light. Other features, such as the gear simplicity factor (G) will be comparatively unimportant in these uses. On the other hand, for use as a delay device, optical properties may be of no interest while the simplicity factor (G) may be the factor of chief importance.

Fig. 3 shows that all the liquid mixtures represented in the figure have peak temperatures lower than that of water while with the sole exception of acetonitrile mixtures, their peak velocities are higher. Extensive tests have shown that this is generally true for mixtures with water of a large number of different liquids, even when the actual propagation velocities of these liquids taken singly are substantially less than that of water. This behavior is at variance with the usual behavior of liquid mixtures in which the properties are usually intermediate between the properties of the components. This apparently anomalous result, together with the fact that organic liquids display no peak velocity or temperature within the working range, may be tentatively explained on the hypothesis that the velocity-temperature curve for each liquid, singly, is actually a parabola of a form generally like the known curve for water, and that the corresponding curves for mixtures of that liquid with water in various proportions are similar. In Fig. 4, which depicts this hypothesis graphically, units of temperature and velocity have been purposely omitted from the horizontal and vertical scales, respectively, since the figure is not to be taken as being quantitatively exact. In this figure the curve W is the known velocity-temperature curve for water. The curve A is a similar hypothetical curve for another liquid whose velocity in the normal range is less than that of water while the remaining curves are similar hypothetical curves for W and A mixtures of various proportions. The curves are solid lines in the normal working temperature range and broken lines outside of this range. It will be observed that each curve may have a maximum value representing a peak velocity-peak temperature point and that a $V_p$—$T_p$ curve may be drawn connecting these points which is everywhere higher than the peak velocity for water. It appears that the relation which characterizes each particular single liquid is not the relation between the propagation velocity and its temperature coefficient, but rather the relation between peak velocity and peak temperature. Thus it is consistent with all the observations that each liquid should exhibit a zero temperature coefficient peak which may be substantially beyond the normal temperature range, and that mixtures of that liquid with another such as water should exhibit zero temperature-coefficient peaks at intermediate temperatures and velocities.

It is to be borne in mind that in order to take full advantage of the zero temperature coefficient of the mixtures of the invention, they should be maintained at or near the temperature at which the temperature coefficient obtains. For use outdoors this usually entails a heater element and thermostatic control means such as those shown in Fig. 1. For use indoors, for example in a laboratory in which the ambient temperature is maintained, for example, between 65° F. and 75° F. such means may be dispensed with, reliance being placed on the heating equipment of the building which houses the apparatus to supply this need.

As hereinabove indicated, the propagation velocity of 1739 yards per second (1589 meters per second) cooperates with a lead screw having 15$\frac{11}{15}$ turns per inch and a simple gear train of ten-to-six ratio to produce an exact integral relation between the turns of the lead screw and the distance of the object in yards. If a lead screw of different pitch were readily available, or if a calculating device were arranged to operate with input signals related to some other units of length, such as feet or meters, a somewhat different propagation velocity would be desirable. Within limits, such other propagation velocities may be obtained by mixing two different liquids in suitable proportions in accordance with the principles of this invention.

Though described in terms of its embodiment in an ultrasonic compression wave device, the invention is not limited thereto, the principles of the invention being equally applicable to devices for the propagation of waves of widely different types, and at widely different frequencies.

What is claimed is:

1. A wave propagation device designed for use within the limits of a specified range of temperatures, said device comprising a fluid mixture of at least two components, one of said components having a positive temperature coefficient of wave propagation velocity for temperatures within said specified range, and the other of said components having a negative temperature coefficient of wave propagation velocity for temperatures within said specified range, said components being present in said mixture in such proportions as to give a substantially zero temperature coefficient of wave propagation velocity at a preassigned temperature within said specified range.

2. A wave propagation device designed for use within the limits of a specified range of wave propagation velocities, said device comprising a fluid mixture of at least two components, one of said components having a positive temperature coefficient of wave propagation velocity for propagation velocities within said specified range, and the other of said components having a negative temperature coefficient of wave propagation velocity for propagation velocities within said specified range, said components being present in said mixture in such proportions as to give a sub- stantially zero temperature coefficient of wave propagation velocity at a preassigned propagation velocity within said specified range.

3. A wave propagation device for use within the limits of a specified range of temperatures and velocities, said device comprising a fluid mixture of at least two components, one of said components having a positive temperature coefficient of wave propagation velocity for temperatures and velocities within said range, and the other of said components having a negative temperature coefficient of wave propagation velocity for temperatures and velocities within said range, said components being present in said mixture in such proportions as to give a substantially zero temperature coefficient of wave propagation velocity at a preassigned propagation velocity and at a preassigned temperature within said range.

4. A wave propagation device which comprises a fluid mixture of at least two components, one of said components having a positive temperature coefficient of wave propagation velocity, and the other of said components having a negative temperature coefficient of wave propagation velocity, said components being present in said mixture in such proportions as to give a zero temperature coefficient of wave propagation velocity at a temperature of 135° F. and a velocity of 1739 yards per second at said temperature.

5. A delay device for the measurement of distance which comprises a container, a fluid mixture of at least two components enclosed in said container, one of said fluid components having a positive temperature coefficient of propagation velocity for compressional waves for temperatures within the limits of a preassigned temperature range, and another of said components having a negative temperature coefficient of propagation velocity for compressional waves for temperatures within the limits of said temperature range, said components being present in said mixture in such proportions as to give a substantially zero temperature coefficient of wave propagation velocity at a desired temperature within said preassigned temperature range, means at one part of said container for projecting a compressional wave into said fluid mixture, means at another part of said container for deriving energy from said wave, and means for adjusting the spacing between said projecting means and said energy deriving means.

6. A wave propagation device which comprises an enclosed fluid mixture of at least two components, one of said components having a zero temperature coefficient of wave propagation velocity at a velocity less than a certain stipulated velocity, another of said components having a zero temperature coefficient of wave propagation velocity at a velocity greater than said stipulated velocity, said components being mixed in such proportions as to give a substantially zero temperature coefficient of propagation velocity at substantially said stipulated velocity.

7. A wave propagation device which comprises a fluid mixture of at least two components, one of which is distinguished by a positive temperature coefficient of wave propagation velocity over a specified range of temperatures and velocities and another of which is distinguished by a negative coefficient of propagation velocity over said range, the proportions of said components in said mixture being such that said mixture has a desired propagation velocity and a zero temperature coefficient of propagation velocity at a temperature within said range.

8. A wave propagation device which comprises a fluid mixture of at least two components, one of which is distinguished by a positive temperature coefficient of wave propagation velocity over a specified range of temperatures and velocities and another of which is distinguished by a negative coefficient of propagation velocity over said range, the proportions of said components in said mixture being such that said mixture has a desired propagation velocity and a zero temperature coefficient of propagation velocity at a temperature within said range, and means for maintaining said mixture substantially at said last-named temperature.

9. A delay device for the measurement of distance which comprises a container, a fluid mixture of at least two components enclosed in said container, one of said fluid components having a positive temperature coefficient of propagation velocity for compressional waves for temperatures within the limits of a preassigned temperature range, and another of said components having a negative temperature coefficient of propagation velocity for compressional waves for temperatures within the limits of said range, means at one part of said container for projecting a compressional wave into said fluid mixture, means at another part of said container for deriving energy from said wave, and means for adjusting the spacing between said projecting means and said energy deriving means, said spacing-adjusting means comprising a lead screw, a countershaft, and a gear train coupling said lead screw to said countershaft, said gear train having a ratio of small whole numbers, the proportions in which said fluid components are present being such as to give a substantially zero coefficient of propagation velocity for said waves at a predetermined temperature within said temperature range and at a desired preassigned velocity such that said countershaft may be directly calibrated in units of distance measure.

10. A delay device for the measurement of the distance separating said device from an object to be located which comprises a container, a fluid mixture of at least two components enclosed in said container, one of said fluid components having a positive temperature coefficient of propagation velocity for traveling waves for temperatures within the limits of a preassigned temperature range, and another of said components having a negative temperature coefficient of propagation velocity for traveling waves for temperatures within the limits of said range, means at one part of said container for projecting a traveling wave into said fluid mixture, means at another part of said container for deriving energy from said wave, means for adjusting the spacing between said projecting means and said energy deriving means, said spacing-adjusting means comprising a lead screw, a countershaft, and a gear train coupling said lead screw to said countershaft, said gear train having a ratio of small whole numbers, the proportions in which said fluid components are present being such as to give a substantially zero coefficient of propagation velocity for said waves at a predetermined temperature within said temperature range and at a desired preassigned velocity such that each turn of said countershaft corresponds to a change in said distance of a multiple of ten units of distance measure.

11. In a system of the type in which means are utilized for transmitting an electromagnetic wave to an object and for receiving a reflected wave therefrom, a delay device for the measurement of the distance to said object which comprises a container, a fluid mixture of at least two components enclosed in said container, one of said fluid components having a positive temperature coefficient of propagation velocity for compressional waves and another of said components having a negative temperature coefficient of propagation velocity for compressional waves, means in one part of said container for projecting a compressional wave into said fluid mixture, means in another part of said container for deriving energy from said wave, means for adjusting the spacing between said projecting means and said energy deriving means, said spacing-adjusting means comprising a lead screw having a preassigned pitch, a countershaft, and a gear train coupling said countershaft to said lead screw, said gear train having a ratio of small whole numbers, the proportions in which said fluid components are present being such as to give a substantially zero coefficient of propagation velocity for said waves at a preassigned velocity, which preassigned velocity is so correlated with the pitch of said lead screw and the ratio of said gear train that each single rotation of said countershaft corresponds with substantial exactness to a preassigned whole number of units of distance traversed by said electromagnetic wave in its travel to said object.

WILLIAM SHOCKLEY.
GERALD W. WILLARD.